(12) United States Patent
Zhou et al.

(10) Patent No.: US 9,572,149 B1
(45) Date of Patent: Feb. 14, 2017

(54) USE OF ASSIGNED PDSCH RESOURCE TO ASSIGN PDSCH RESOURCE OF SUBSEQUENT TTI

(71) Applicant: Sprint Spectrum L.P., Overland Park, KS (US)

(72) Inventors: Yu Zhou, Herndon, VA (US); Muhammad A. Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 120 days.

(21) Appl. No.: 14/476,316

(22) Filed: Sep. 3, 2014

(51) Int. Cl.
*H04W 72/04* (2009.01)
*H04W 28/02* (2009.01)

(52) U.S. Cl.
CPC ....... *H04W 72/042* (2013.01); *H04W 28/0289* (2013.01); *H04W 72/0486* (2013.01)

(58) Field of Classification Search
None
See application file for complete search history.

(56) References Cited

U.S. PATENT DOCUMENTS

| | | | | |
|---|---|---|---|---|
| 2010/0254268 | A1* | 10/2010 | Kim | H04W 36/385 370/241 |
| 2011/0243066 | A1 | 10/2011 | Nayeb Nazar et al. | |
| 2013/0163543 | A1* | 6/2013 | Freda | H04W 72/0406 370/329 |
| 2013/0163551 | A1 | 6/2013 | He et al. | |
| 2014/0233663 | A1* | 8/2014 | Kang | H04L 5/0037 375/260 |

FOREIGN PATENT DOCUMENTS

JP WO 2014069568 A1 * 5/2014 .......... H04W 72/042

OTHER PUBLICATIONS

A. Roessler, M. Kottkamp, "LTE-Advanced (3GPP Rel. 11) Technology Introduction White Paper," (2013).
First Action Interview Pilot Program Pre-Interview Communication from U.S. Appl. No. 14/329,000, dated Mar. 25, 2016.
Office Action from U.S. Appl. No. 14/329,000, dated Jul. 18, 2016.

* cited by examiner

*Primary Examiner* — Awet Haile

(57) ABSTRACT

Disclosed is a method and system in which a PDSCH segment assigned to a UE in a particular TTI not only carries data to the UE but also carries an assignment to the UE of a PDSCH in a subsequent TTI for carrying additional data to the UE in that subsequent TTI. Such an arrangement can help make good use of possibly otherwise unused PDSCH capacity and can help to manage PDCCH capacity in the subsequent TTI.

15 Claims, 10 Drawing Sheets

USE OF ASSIGNED PDSCH RESOURCE TO ASSIGN PDSCH RESOURCE OF SUBSEQUENT TTI

BACKGROUND

Unless otherwise indicated herein, the materials described in this section are not prior art to the claims and are not admitted to be prior art by inclusion in this section.

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining a respective bandwidth of coverage, and each coverage area may define an air interface providing a downlink for carrying communications from the base station to UEs and an uplink for carrying communications from UEs to the base station. The downlink and uplink may operate on separate carriers or may be time division multiplexed over the same carrier(s). Further, the air interface may define various channels for carrying communications between the base station and UEs. For instance, the air interface may define one or more downlink traffic channels and downlink control channels, and one or more uplink traffic channels and uplink control channels.

In accordance with the Long Term Evolution (LTE) standard of the Universal Mobile Telecommunications System (UMTS), for instance, each coverage area of a base station may operate on one or more carriers spanning 3 MHz, 5 MHz, 10 MHz, 15 MHz, or 20 MHz. On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

In LTE, downlink air interface resources are mapped in the time domain and in the frequency domain. In the time domain, LTE defines a continuum of 10 millisecond (ms) frames, divided into 1 ms sub-frames and 0.5 ms slots. With this arrangement, each sub-frame is considered to be a transmission time interval (TTI). Thus, each frame has 10 TTIs, and each TTI has 2 slots. In the frequency domain, resources are divided into groups of 12 sub-carriers. Each sub-carrier is 15 kHz wide, so each group of 12 sub-carriers occupies a 180 kHz bandwidth. The 12 sub-carriers in a group are modulated together, using orthogonal frequency division multiplexing (OFDM), to form one OFDM symbol.

LTE further defines a particular grouping of time-domain and frequency-domain resources as a downlink resource block. In the time domain, each downlink resource block has a duration corresponding to one sub-frame (1 ms). In the frequency domain, each downlink resource block consists of a group of 12 sub-carriers that are used together to form OFDM symbols. Typically, the 1 ms duration of a downlink resource block accommodates 14 OFDM symbols, each spanning 66.7 microseconds, with a 4.69 microsecond guard band (cyclic prefix) added to help avoid inter-symbol interference. Depending on the bandwidth of the downlink carrier, the air interface may support transmission on a number of such downlink resource blocks in each TTI. For instance, a 5 MHz carrier supports 25 resource blocks in each TTI, whereas a 15 MHz carrier supports 75 resource blocks in each TTI.

The smallest unit of downlink resources is the resource element. Each resource element corresponds to one sub-carrier and one OFDM symbol. Thus, a resource block that consists of 12 sub-carriers and 14 OFDM symbols has 168 resource elements. Further, each OFDM symbol and thus each resource element can represent a number of bits, with the number of bits depending on how the data is modulated. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits.

Within a resource block, and cooperatively across all of the resource blocks of the carrier bandwidth, different resource elements can have different functions. In particular, a certain number of the resource elements (e.g., 8 resource elements distributed throughout the resource block) may be reserved for reference signals used for channel estimation. In addition, a certain number of the resource elements (e.g., resource elements in the first one, two, or three OFDM symbols) may be reserved for the PDCCH and other control channels, and most of the remaining resource elements (e.g., most of the resource elements in the remaining OFDM symbols) would be left to define the PDSCH.

Across the carrier bandwidth, each TTI of the LTE air interface thus defines a control channel space that generally occupies a certain number of 66.7 microsecond symbol time segments (e.g., one, two, or three such symbol time segments), and a PDSCH space that generally occupies the remaining symbol time segments, with certain exceptions for particular resource elements. With this arrangement, in the frequency domain, the control channel space and PDSCH space both span the entire carrier bandwidth. In practice, the control channel space is then treated as being a bandwidth-wide space for carrying control signaling to UEs. Whereas, the PDSCH space is treated as defining discrete 12-subcarrier-wide PDSCH segments corresponding to the resource block definitions across the carrier bandwidth.

One of the main functions of the PDCCH in LTE is to carry "Downlink Control Information" (DCI) messages to served UEs. LTE defines various types or "formats" of DCI messages, to be used for different purposes, such as to indicate how a UE should receive data in the PDSCH of the current TTI, or how the UE should transmit data on the PUSCH in an upcoming TTI. For instance, a DCI message in a particular TTI may schedule downlink communication of bearer data to a particular UE (i.e., a UE-specific data transmission), by specifying one or more particular PDSCH segments that carry the bearer data in the current TTI, what modulation scheme is used for that downlink transmission, and so forth.

Each DCI message may span a particular set of resource elements on the PDCCH (e.g., one, two, four, or eight control channel elements (CCEs), each including 36 resource elements) and may include a cyclic redundancy check (CRC) that is masked (scrambled) with an identifier (e.g., cell radio network temporary identifier (C-RNTI)) assigned to the UE, so that the UE can identify and read the DCI message. In practice, a UE may monitor the PDCCH in each TTI in search of a DCI message destined to the UE. In particular, the UE may engage in a "blind decoding" process in which the UE reads various candidate groups of resource elements on the PDCCH in search of a DCI message masked with the UE's identifier. If the UE finds such a DCI message, the UE may then read that DCI message and proceed as indicated. For instance, if the DCI message schedules downlink communication of bearer data to the UE in particular PDSCH segments of the current TTI, the UE may then read the indicated PDSCH segment(s) of the current TTI to receive that bearer data.

OVERVIEW

In a system as described above, the smallest air-interface unit that a base station can assign for transmission of data to a UE is a PDSCH segment corresponding to one 12-sub-carrier-wide resource block. When a base station has data to transmit to a UE in a particular TTI, the base station may thus assign one or more such PDSCH segments to the UE, sufficient to carry the data using whatever modulation scheme the base station plans to use for the transmission. In particular, as noted above, the base station may transmit on the PDCCH of the TTI a DCI message to the UE, specifying in the DCI message the assigned PDSCH segment(s) and the modulation scheme that will be used, and the UE may respond to that DCI message by reading the data from the designated PDSCH segment(s).

Several issues can arise with this arrangement, however. First, the data that the base station seeks to transmit to a UE in a particular TTI may not fill all of the resource elements of the PDSCH segment(s) that the base station assigns for carrying that data. For instance, if the base station assigns one such PDSCH segment for carrying data to the UE in the TTI but the data that the base station has for transmission to the UE in that TTI fills only half of the PDSCH segment, the other half of the PDSCH segment would go unused. Likewise, if the base station assigns multiple such PDSCH segments for carrying data to the UE in the TTI but the data that the base station has for transmission to the UE in the TTI fills all but a part of the last such PDSCH segment, that part of the last PDSCH segment would go unused. This non-use of a portion of PDSCH resources is inefficient, particularly if PDSCH resources are in high demand.

Second, the PDCCH in each TTI has limited capacity. In a scenario where the base station has many DCIs to send to UEs, it is possible that the base station could run out of room in the PDCCH of a given TTI to carry further DCIs in that TTI. If and when that happens, the base station may then need to delay transmission of the DCI and associated data until a later TTI. However, such delay may result in reduced throughput for the UE at issue.

Disclosed herein is a method and system to help overcome these issues. In accordance with the disclosure, when a base station has data to transmit to a particular UE in a particular TTI and the base station assigns to the UE a PDSCH segment of that TTI for carrying the data to the UE, the base station will transmit in the assigned PDSCH segment not only the data but also an assignment to the UE of at least one PDSCH segment of a subsequent TTI for carrying additional data to the UE in that subsequent TTI.

In a scenario where the base station would have had spare capacity in the assigned PDSCH segment of the particular TTI, this arrangement may thus help to make good use of that spare capacity to carry to the UE a DCI that the base station would have otherwise transmitted on the PDCCH of the subsequent TTI, thus also helping to reduce use of the PDCCH of the subsequent TTI. Further, even if the base station has sufficient data to completely fill the resource elements of the PDSCH segment assigned to the UE in the particular TTI, the base station could still make room in that PDSCH segment to carry a DCI to the UE for a subsequent TTI, so as to help control capacity of the PDCCH of the subsequent TTI. In that case, the base station may defer transmission of a portion of the data to the UE, in order to accommodate transmission in the assigned PDSCH segment of a DCI that the base station would have otherwise sent to the UE in the subsequent TTI.

Accordingly, in one respect, disclosed is a method operable by a cellular base station, such as an LTE base station (e.g., evolved Node B (eNodeB)) for instance, that is configured to serve UEs via an air interface that spans a frequency bandwidth and that defines over time a sequence of TTIs, with each TTI defining a PDSCH divided over the frequency bandwidth into a plurality of PDSCH segments each individually assignable on a per-UE basis to carry UE-specific data. In accordance with the method, the base station receives (e.g., from a serving gateway) data for transmission over the air interface to a particular UE. In response to receiving that data (e.g., as the base station has such data buffered for transmission to the UE), the base station then assigns at least one of the PDSCH segments of a particular TTI for carrying the received data over the air interface to the particular UE. Further, the base station transmits to the UE, in the assigned PDSCH segment of the particular TTI, both the received data and an assignment to the UE of at least one PDSCH segment of a subsequent TTI (e.g., next or later TTI) for carrying additional data to the UE in the subsequent TTI.

In another respect, disclosed is a base station that is configured to serve UEs via an air interface that spans a frequency bandwidth and that defines over time a sequence of TTIs, with each TTI defining a PDSCH divided over the frequency bandwidth into a plurality of PDSCH segments each individually assignable on a per-UE basis to carry UE-specific data. As disclosed, the base station includes a backhaul interface through which the base station is configured to receive data for transmission to UEs, and an antenna structure configured to transmit on the air interface. In addition, the base station includes a controller (e.g., a programmed processing unit) that is configured to respond to receipt by the base station via the backhaul interface of data for transmission over the air interface to a particular UE by (i) assigning at least one of the PDSCH segments of a particular TTI for carrying the received data over the air interface to the particular UE and (ii) causing the base station to transmit via the antenna structure to the UE, in the assigned PDSCH segment of the particular TTI, both the received data and an assignment to the UE of at least one PDSCH segment of a subsequent TTI for carrying additional data to the UE in the subsequent TTI.

Further, in still another respect, disclosed is a method operable by a UE, such as an LTE UE for instance, that is configured to be served by a base station via an air interface that spans a frequency bandwidth and that defines over time a sequence of TTIs, with each TTI defining a PDSCH divided over the frequency bandwidth into a plurality of PDSCH segments each individually assignable on a per-UE basis to carry UE-specific data. In accordance with the method, the UE receives, in a PDSCH segment assigned to the UE for carrying data destined to the UE in a particular TTI, both (i) the data destined to the UE and (ii) an assignment to the UE of at least one PDSCH segment of a subsequent TTI for carrying additional data to the UE in the subsequent TTI. The UE then passes the received data to an application layer of the UE for processing. Further, responsive to the received assignment to the UE of the least one PDSCH segment of the subsequent TTI, the UE reads the additional data from the at least one PDSCH segment of the subsequent TTI.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
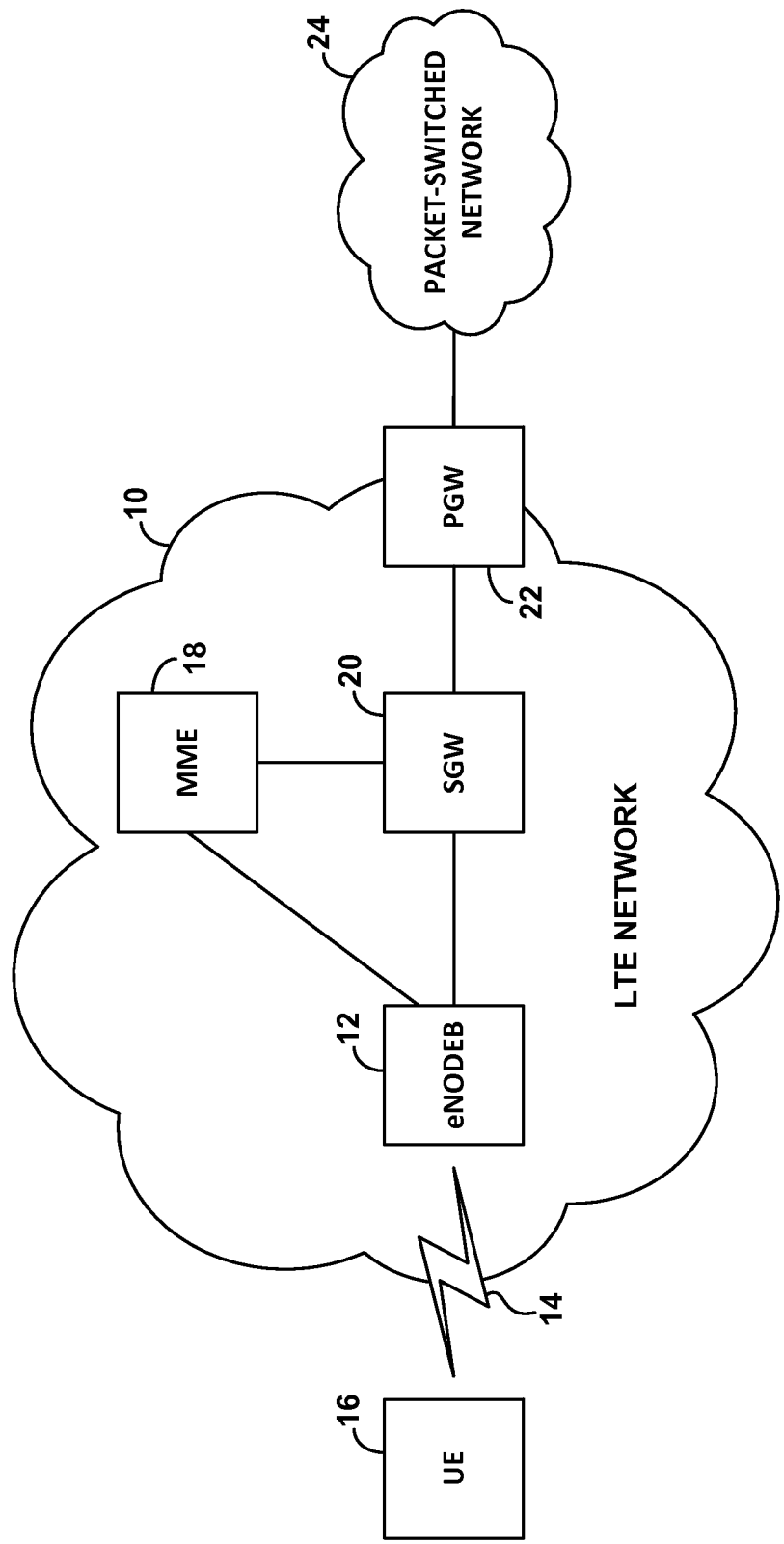
FIG. 1 is a simplified block diagram of a wireless communication system in which the present method and apparatus can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes an eNodeB 12, which has an antenna structure and associated equipment for providing an LTE coverage area 14 in which to serve UEs such as an example UE 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

With this arrangement as shown, the UE 16 may be attached (i.e., registered) with the eNodeB 12 on a particular carrier, such a particular carrier having a defined frequency bandwidth and structure as described above, and the UE may have one or more established bearers for carrying bearer data between the UE and packet-switched network 24. In such an arrangement, the eNodeB 12 may at times receive, from SGW 20 or other source, packet-data that is destined to the UE, and the eNodeB may buffer that data for transmission to the UE. The eNodeB 12 may then assign one or more PDSCH segments to carry that data to the UE in a particular TTI and may thus transmit to the UE a DCI specifying that assignment, and transmit the data to the UE in the assigned PDSCH segment(s).

Figure 2A:
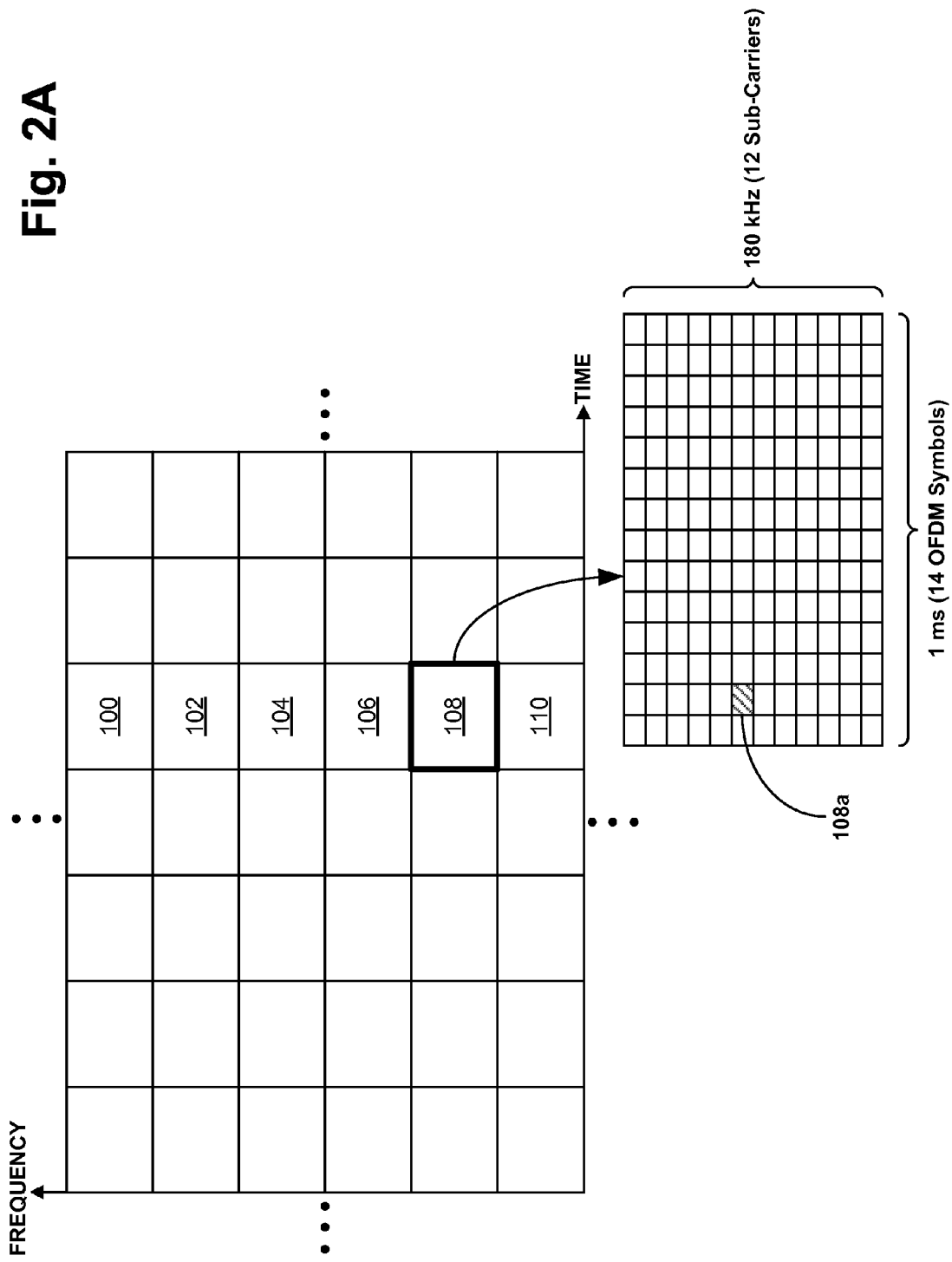
FIG. 2A is an illustration of a division of a shared downlink channel into downlink resource blocks, in accordance with an example embodiment.

FIG. 2A illustrates how the downlink resources in the eNodeB's coverage area 14 may be divided in time and frequency domains into resource blocks under LTE. In the time domain, each resource block occupies a 1 ms TTI. By way of example, FIG. 2A shows resource blocks 100-110 for a particular TTI. In the frequency domain, each of resource blocks 100-110 occupies a respective portion of frequency bandwidth, typically 180 kHz. Although FIG. 2A shows six resource blocks in each TTI, a wireless coverage area could have a greater number of resource blocks, as indicated by the dots above and below resource blocks 100-110. As noted above, for instance, in a 5 MHz LTE carrier, a total of 25 resource blocks may span the bandwidth in each 1 ms TTI.

FIG. 2A also includes a more detailed view of downlink resource block 108. This detailed view shows that the 180 kHz of frequency bandwidth corresponds to 12 sub-carriers of 15 kHz each, and also shows that the 1 ms TTI corresponds to the duration of 14 OFDM symbols (although the number of OFDM symbols in a downlink resource block can vary). Each OFDM symbol spans the 12 sub-carriers and includes a respective sub-carrier symbol on each sub-carrier. Thus, as noted above, a downlink resource block may be described as a set of resource elements, with each resource element corresponding to a sub-carrier symbol that is carried on a particular sub-carrier for the duration of one OFDM symbol. The detailed view of downlink resource block 108 in FIG. 2A shows the division of the resource block into multiple resource elements, such as resource element 108a.

Figure 2B:
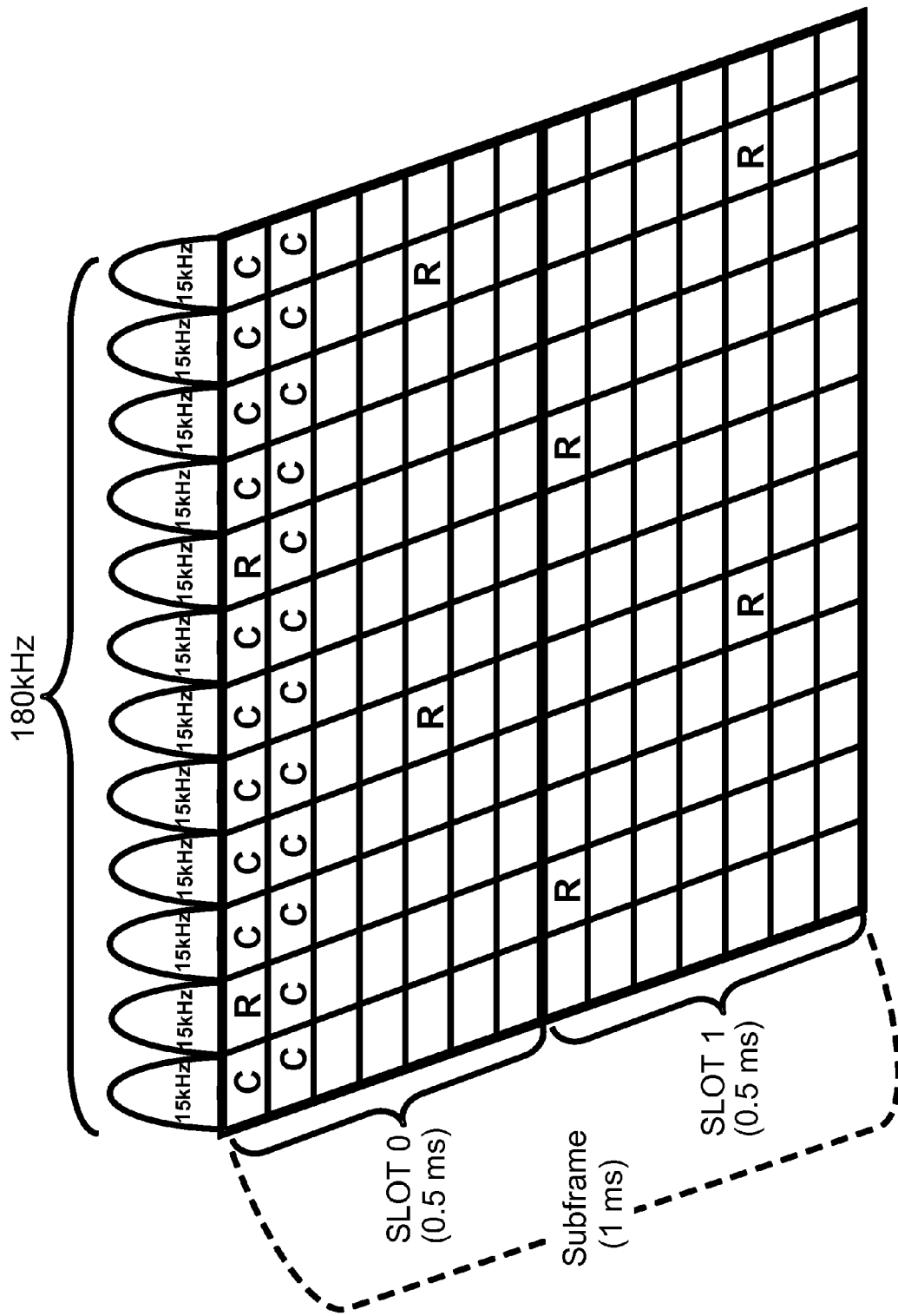
FIG. 2B is an illustration of a downlink resource block, in accordance with an example embodiment.

As further noted above, different resource elements in a downlink resource block may be used for different purposes. FIG. 2B illustrates different functions among the 168 resource elements in an example downlink resource block. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (including, for instance, the PDCCH). The other 138 resource elements that are unlabeled can be used to define the PDSCH for transmitting bearer data and other scheduled transmissions. It is to be understood that FIG. 2B illustrates only one possible configuration, and that a downlink resource block could have other configurations as well.

Figure 2C:
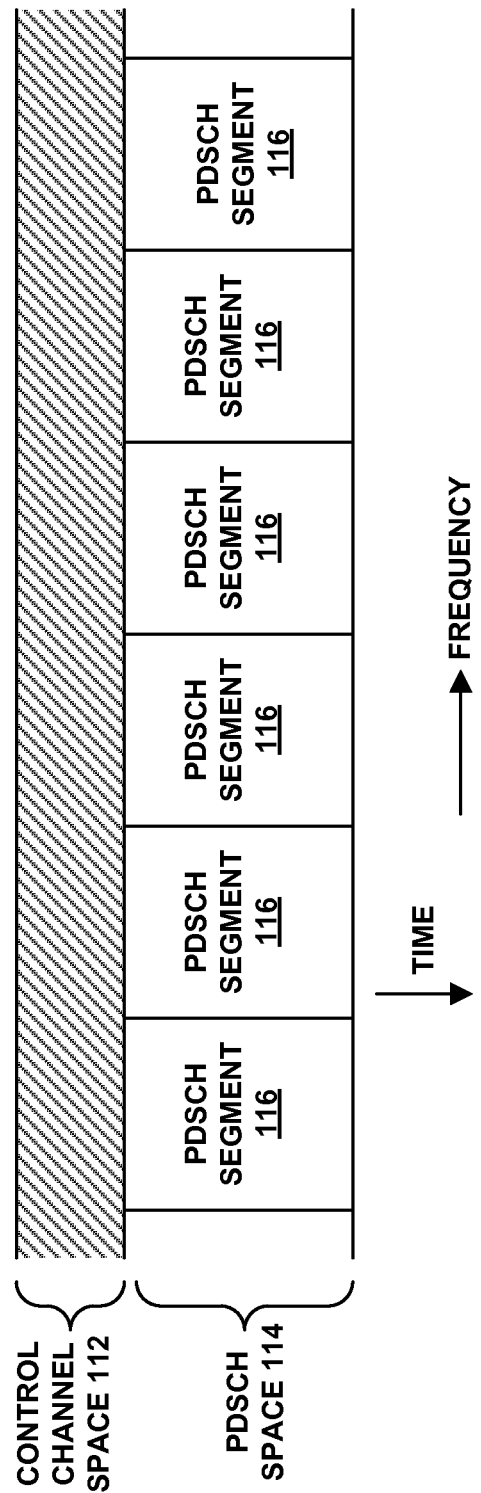
FIG. 2C is an illustration of a segment of a downlink TTI, depicting a relationship between control channel space and PDSCH space.

FIG. 2C next depicts a segment of an example downlink TTI, to help illustrate the example relationship between the control channel space (e.g., PDCCH space) and PDSCH space across the bandwidth of a representative carrier. In particular, FIG. 2C provides another view of the six example resource blocks 100-110 of FIG. 2A. As shown, a first portion of time (one or more OFDM symbol time segments) of each resource block is reserved for use to define control channel space 112 that spans all of the resource blocks in the TTI. The remaining portion of each resource block (other than resource elements reserved for reference symbol use or the like) is then available for use to define PDSCH space 114, divided into a series of PDSCH segments 116 as shown.

When a UE is served on this carrier and the eNodeB has data to transmit to the UE in a particular TTI (e.g., per scheduling by the eNodeB), the eNodeB may assign one or more of the PDSCH segments in the TTI to carry the data to the UE. (In practice, the eNodeB may assign one or more resource blocks, but practically speaking, it is the PDSCH segment portion of each such resource block that is being assigned to carry data to the UE, since the control channel portion of each such resource block is really just part of the bandwidth-wide control channel space.) In that TTI, the eNodeB may then normally transmit the data in the assigned PDSCH segment(s) and transmit to the UE in the PDCCH of the control channel space 112 a DCI message that specifies the PDSCH segment(s) carrying the data. Through blind decoding as discussed above, the UE may then find and read that DCI message on the PDCCH and responsively read the transmitted data from the specified PDSCH segment(s). The UE may then pass that data through various logical layers of the UE, ultimately arriving at an application layer for processing.

As noted above, a PDSCH segment that the eNodeB assigns for carrying data to a UE in a given TTI may have some spare capacity beyond that used for carrying the data, either as a result of the eNodeB not having additional data for transmission to the UE in that TTI or as a result of the eNodeB intentionally freeing up some space in the PDSCH segment by deferring transmission of some data to a later PDSCH segment. In practice, this spare capacity may take the form of a certain number of unused resource elements in the PDSCH segment. Alternatively, considering that each resource element represents a certain amount of data (depending on the modulation scheme) and thus that the PDSCH segment has a certain total data capacity, the spare capacity could take the form of an unused portion of that total data capacity.

Figure 3:
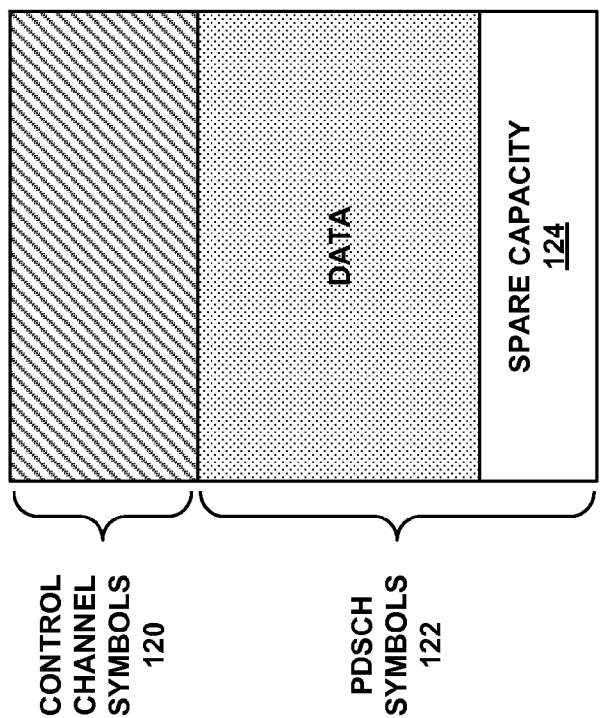
FIG. 3 illustrates a representative resource block with spare capacity in its associated PDSCH segment.

FIG. 3 depicts a representative LTE resource block showing an example of such spare capacity in the associated PDSCH segment. In particular, as shown in FIG. 3, the resource block includes control channel symbols 120 and PDSCH symbols 122. The illustrated control channel symbols 120 would define a portion of the control channel space 112 in the TTI at issue, and the PDSCH symbols 122 would define an example PDSCH segment in the TTI at issue. As shown, the PDSCH segment contains data to be transmitted to a particular UE, but has some spare capacity 124. This figure shows the spare capacity as being perhaps a number of symbol time segments of the PDSCH segment, such as three symbol time segments for instance. However, the spare capacity could be situated elsewhere or in another manner in the PDSCH segment.

Figure 4:
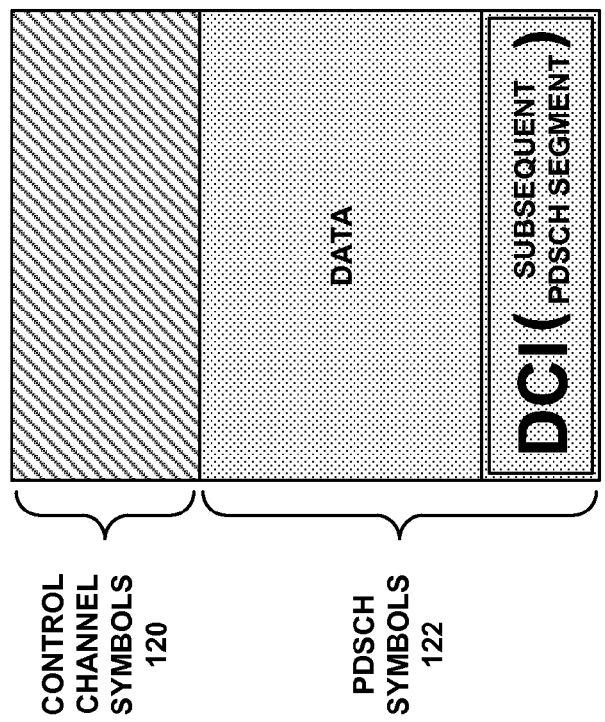
FIG. 4 illustrates the representative resource block of FIG. 3, with a DCI message added in the place where the resource block had spare capacity.

FIG. 4 next depicts the same representative resource block, showing an example of how the eNodeB could use the spare capacity of the PDSCH segment to carry a DCI message to the UE to which the PDSCH segment is assigned. Such a DCI may take the place of a DCI message that the eNodeB would have transmitted to the UE in a subsequent TTI, and may thus carry an assignment to the UE of at least one PDSCH segment of the subsequent TTI. Thus, the PDSCH segment of the resulting resource block as shown in FIG. 4 contains data to be transmitted to the UE and also carries a DCI message that assigns to the UE at least one PDSCH segment of a subsequent TTI.

In practice, the number of resource elements needed to carry this DCI message to the UE in the PDSCH segment may be less than the number of resource elements that would have been needed to carry the DCI message to the UE on the PDCCH of the subsequent TTI, for at least two possible reasons. First, the resource elements of the PDSCH segment may use a higher order modulation scheme than the resource elements of the PDCCH, thus supporting communication of a given amount of control signaling in fewer resource elements. Second, as the UE would already be directed to read the particular PDSCH segment, the eNodeB might be able to engage in the DCI message transmission without using certain resources that the eNodeB would otherwise need to use in order to facilitate blind decoding by the UE.

Figure 5:
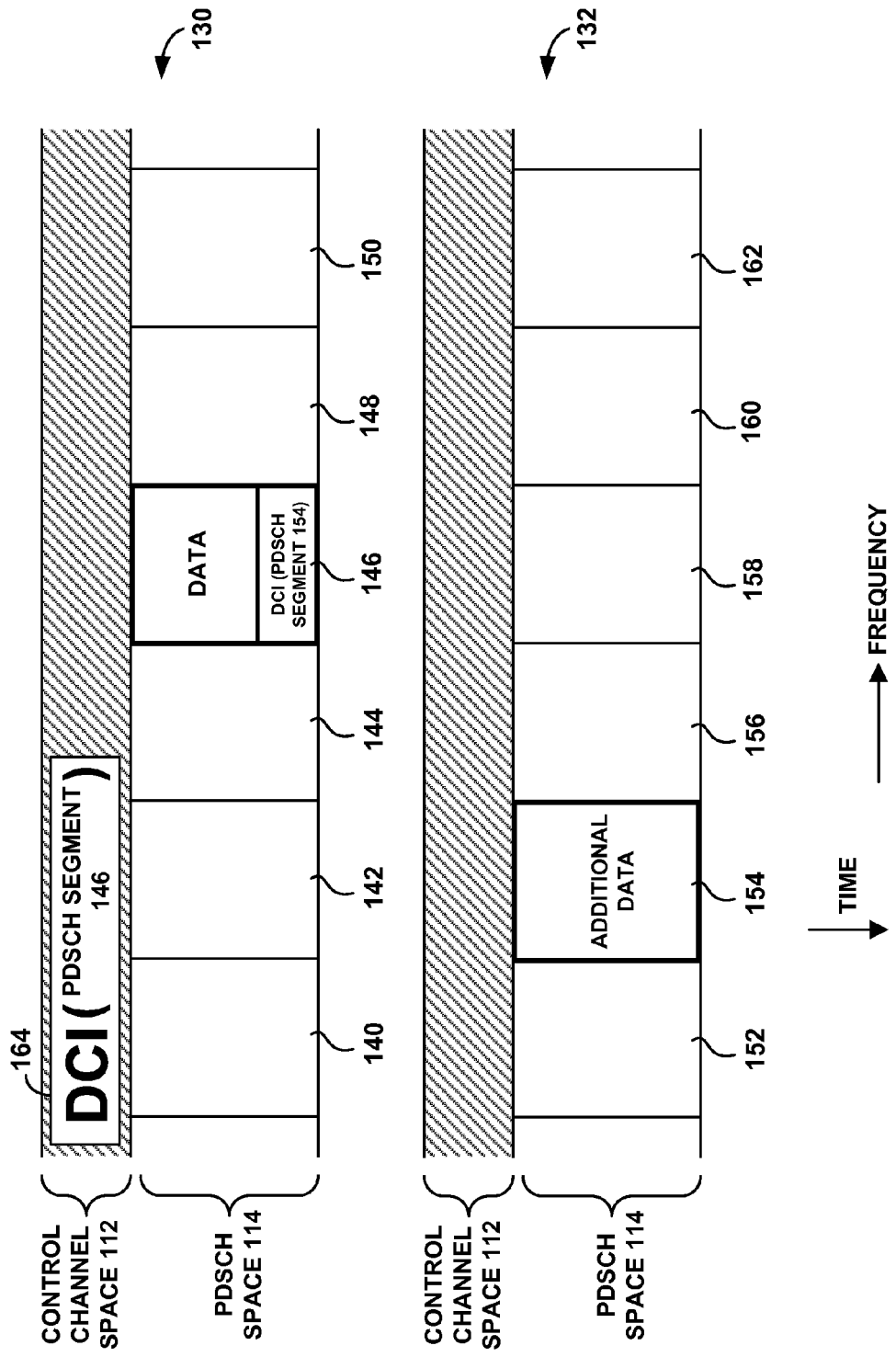
FIG. 5 illustrates multiple example TTIs, showing how a PDSCH segment assigned to a UE in one TTI can carry a DCI message assigning to the UE at least one PDSCH segment of a subsequent TTI.

FIG. 5 next depicts how this process can play out across multiple TTIs in an example system. In particular, FIG. 5 depicts two TTIs like those shown in FIG. 2C, representing one TTI 130 followed in time by another TTI 132 (with TTI 132 being either right after TTI 130 or at some later point after TTI 130). Each TTI is shown including control channel space 112 and PDSCH space 114 as in FIG. 2C. Further, TTI 130 is shown including example PDSCH segments 140-150, and TTI 132 is shown including example PDSCH segments 152-162.

In this example arrangement, TTI 130 is shown carrying in its control channel space (in its PDCCH) a DCI message 164 that assigns PDSCH segment 146. We can assume that this DCI message is to a particular UE, such as by having its CRC masked with a C-RNTI of the UE. Thus the DCI assigns PDSCH segment 146 to that particular UE. As further shown, the TTI 130 then provides in PDSCH segment 146 some data (e.g., bearer data from an SGW) for transmission to the UE but additionally includes a DCI message assigning PDSCH segment 154 of the subsequent TTI 132 for carrying additional data to the UE. TTI 132 is then shown carrying additional data (for the UE) in PDSCH segment 154.

Thus, in practice with this arrangement, when the UE receives the transmission of TTI 130, the UE may engage in blind decoding and there uncover the DCI message 164 in the PDCCH, and the UE may responsively then read PDSCH segment 146 as indicated by the DCI message 164. In particular, the UE may demodulate the modulation symbols of PDSCH segment 146 to thereby uncover a bit sequence that represents (i) the data destined to the UE and (ii) the DCI message assigning PDSCH segment 154 to the UE. The UE may then pass the received data up to its application layer for processing, and, responsive to the assignment in the DCI message, may thereafter read the additional data from PDSCH segment 154 in the subsequent TTI 132.

To facilitate this process in practice, the eNodeB can in some manner denote the presence in the assigned PDSCH segment 146 of a DCI message for the UE, so that the UE would know to look for and respond to such a DCI message rather than treating everything in the PDSCH segment as bearer data. By way of example, the eNodeB could demarcate a division between the data and the DCI message by including a predefined (preferably unlikely to randomly reproduce) bit pattern between the two, and the UE may be programmed to look for such bit pattern and, upon finding it, then separately extract the data and the DCI message. As another example, the eNodeB could include a CRC with respect to just the data, not the DCI message, and the UE could be programmed to detect that the CRC does not match for the entire contents of the PDSCH segment and treat that non-match as indicating possible presence of a DCI message, in which case the UE could then separately extract the data and DCI message. And as still another example, the eNodeB could mask the DCI message in the PDSCH segment with a C-RNTI of the UE, and the UE could engage the same sort of blind decoding process there that it would carry out on the PDCCH to detect and read the DCI message. Other examples are possible as well.

Further, note that this process can be iterative. A PDSCH segment that the eNodeB assigns to the UE in one TTI could carry data for the UE as well as a DCI message that assigns to the UE a PDSCH segment of a subsequent TTI. That PDSCH segment in the subsequent TTI could then similarly carry data for the UE as well as a DCI message that assigns to the UE a PDSCH segment of a further subsequent TTI. And so forth.

Figure 6:
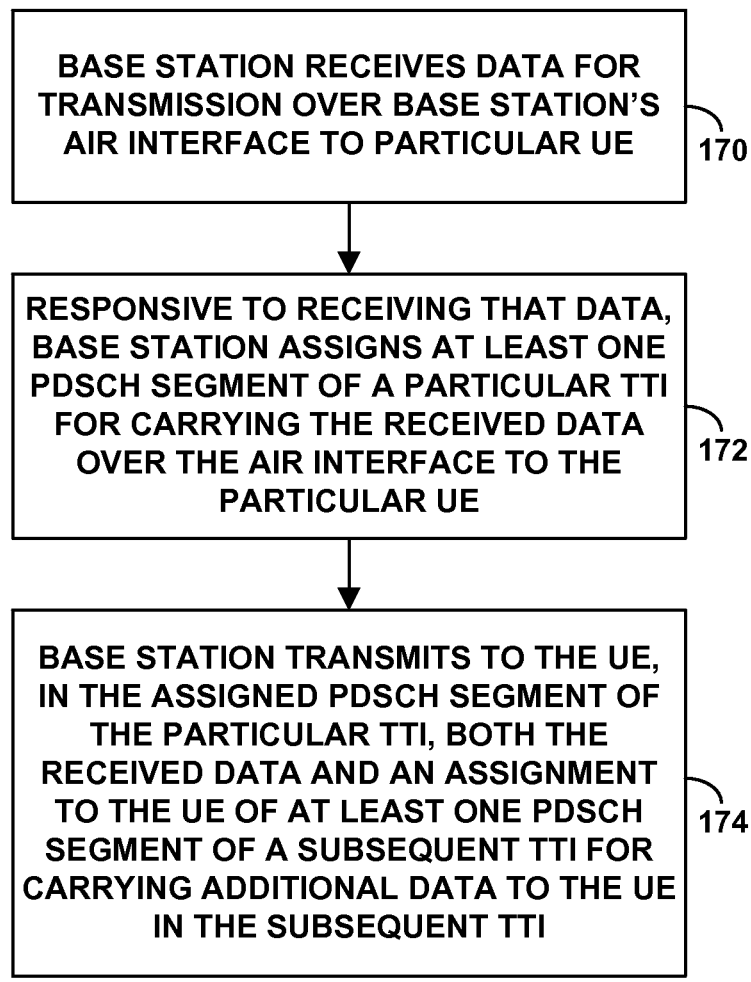
FIG. 6 is a flow chart depicting example base station operations in accordance with the disclosure.

FIG. 6 is next a flow chart depicting operations of a base station such as an LTE eNodeB in accordance with this description. As shown in FIG. 6, at block 170, the base station receives data, perhaps bearer data from an SGW or other source, for transmission over the base station's air interface to a particular UE. At block 172, responsive to receiving that data (e.g., as the received data is buffered at the eNodeB and to be transmitted to the UE), the base station assigns at least one PDSCH segment of a particular TTI for carrying the received data over the air interface to the particular UE. And at block 174, the base station then transmits to the UE, in the assigned PDSCH segment of the particular TTI, both the received data and an assignment to the UE of at least one PDSCH segment of a subsequent TTI for carrying additional data to the UE in the subsequent TTI.

In this method, the data at issue may be the data that the base station will transmit in the assigned PDSCH segment. Further, the base station may assign additional PDSCH segments to the UE beyond the one discussed here, and the base station may receive more data beyond the data that the base station transmits in the PDSCH segment at issue.

The act of assigning the PDSCH segment to the UE may also take various forms. To begin with, the base station may apply a scheduling process, considering available resources, throughput requirements, and so forth, to determine that the base station should transmit the data at issue to the UE in the TTI and to decide that the base station will transmit the data to the UE in the particular PDCCH segment. The base station may then transmit to the UE a DCI message that specifies the assigned PDSCH segment, such as by designating by ordinal number the resource block that defines the PDSCH segment, and perhaps specifying modulation scheme and/or other information that will be used to provide the data in that PDSCH segment. As noted above, the base station could provide this DCI to the UE in a PDCCH of the same TTI that includes the assigned PDSCH segment, or the base station could provide this DCI to the UE in a PDSCH segment assigned to the UE in a previous TTI.

Transmitting the received data and the subsequent PDSCH-segment to the UE in the assigned PDSCH segment may then also take various forms as discussed above. Further, the base station may do this for various reasons, such as in response to the base station detecting that there will be spare capacity (e.g., sufficient to carry the DCI message) in the assigned PDSCH segment and/or in response to detecting that the PDCCH of the subsequent TTI will likely be threshold congested. As to the latter possibility, the base station could monitor PDCCH congestion over time, based on records showing the extent of DCI messaging that the base station is transmitting (e.g., on the PDCCH) on a per TTI basis, and the base station could thereby predict that the PDCCH in the subsequent TTI will be threshold congested (e.g., will be greater than a predefined percentage full, such as greater than 80% full for instance).

Further, in line with the discussion above, the base station may include in the assigned PDSCH segment of the particular TTI some information that enables the UE to detect presence in that PDSCH segment of the assignment of the UE of the at least one PDSCH segment of the subsequent TTI. For instance, the base station could include a predefined bit pattern or other demarcation or flag that the UE would be arranged to detect and treat as an indication of the presence of the assignment.

Figure 7:
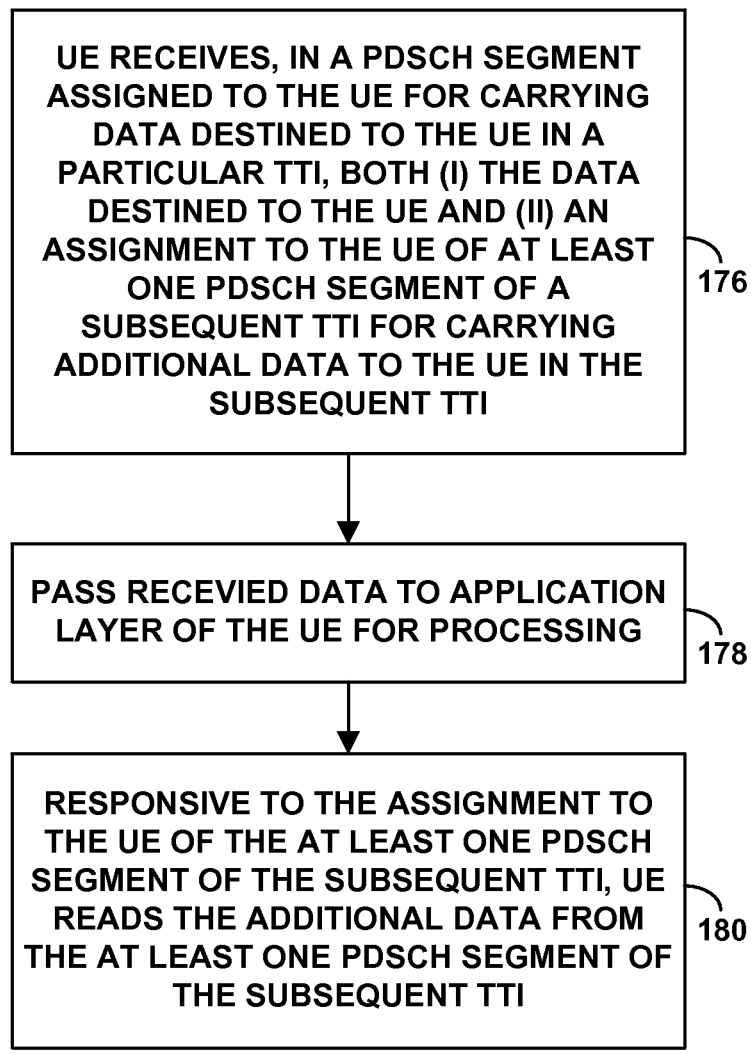
FIG. 7 is a flow chart depicting example UE operations in accordance with the disclosure.

FIG. 7 is next a flow chart depicting operations of a UE such as an LTE UE in accordance with this description. As shown in FIG. 7, at block 176, the UE receives, in a PDSCH segment assigned to the UE for carrying data destined to the UE in a particular TTI, both (i) the data destined to the UE and (ii) an assignment to the UE of at least one PDSCH segment of a subsequent TTI for carrying additional data to the UE in the subsequent TTI. At block 178, that received data is then passed (by processing-logic in the UE) to an application layer of the UE for processing, such as for processing, presentation, or other use by an application program running on the UE. And at block 180, responsive to the assignment to the UE of the at least one PDSCH segment of the subsequent TTI, reading the additional data from the at least one PDSCH segment of the subsequent TTI.

Here again, in line with the discussion above, the assignment of the PDCCH of the particular TTI could be made by a DCI message that the UE receives in a PDCCH of the particular TTI or in a DCI message that the UE receives in a PDSCH segment of a previous TTI.

In addition, also in line with the discussion above, the UE may detect, in the assigned PDSCH segment of the particular TTI, information that indicates presence, in the assigned PDSCH segment of the particular TTI, of the assignment to the UE of the PDSCH segment(s) of the subsequent TTI. For instance, the UE may detect a predefined bit pattern or other information indicating that presence, and the UE may responsively then read and respond to the assignment provided in the PDSCH segment.

Further, in response to the UE receiving in the PDSCH segment of the particular TTI the assignment of the PDSCH segment(s) of the subsequent TTI, the UE may refrain from reading the PDCCH of the subsequent TTI. That is, as to the PDCCH of that subsequent TTI, the UE may forgo engaging in the blind decoding process that the UE would normally carry out as described above, since the UE has already received the assignment of PDSCH segment(s) of that subsequent TTI. Advantageously, this may help conserve power at the UE.

Figure 8:
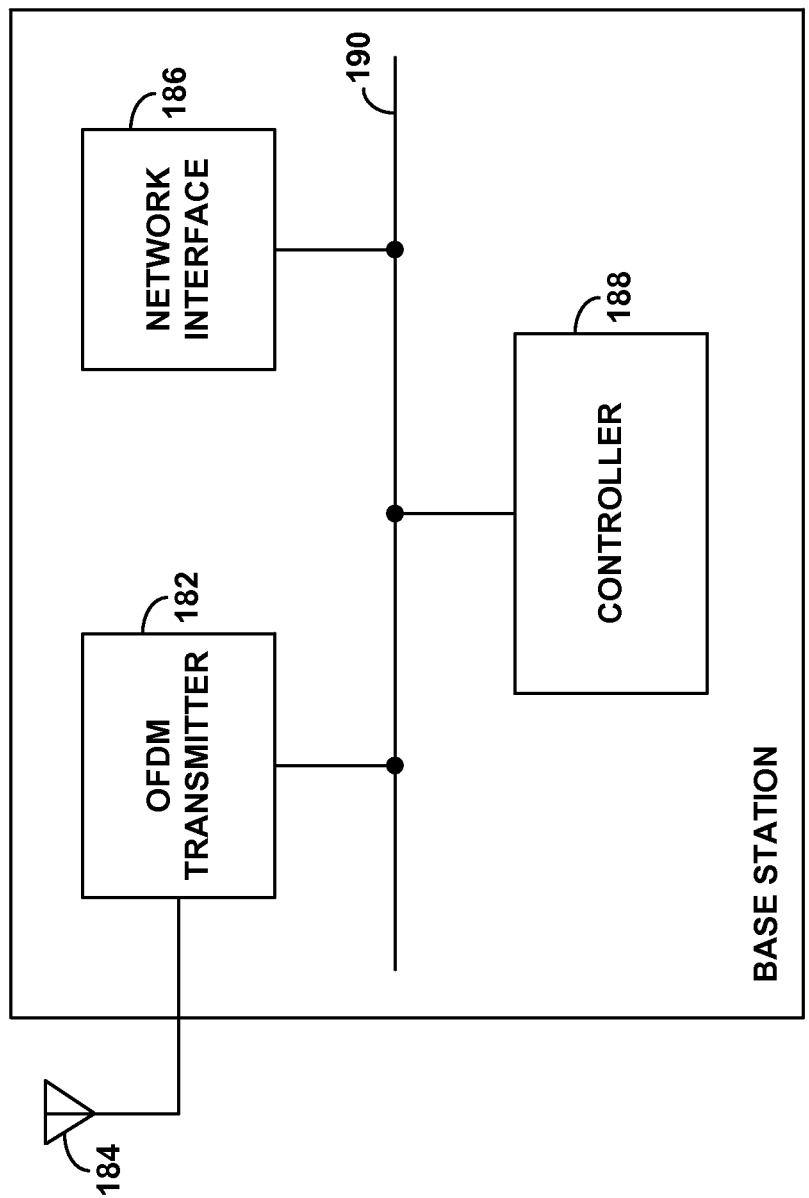
FIG. 8 is a simplified block diagram of an example base station operable in accordance with the disclosure.

FIG. 8 is next a simplified block diagram of an example cellular base station, showing some of the components of such a base station to facilitate operation in accordance with this disclosure. As shown in FIG. 8, the example base station includes an OFDM transmitter (transceiver) 182 and an associated antenna structure 184, as well as a network interface (backhaul interface) 186, and a controller 188, with various ones of these or other components being communicatively linked together by a system bus, network, or other connection mechanism 190 or perhaps integrated together to some extent.

OFDM transmitter 182 and antenna structure 184 may function in combination to provide an OFDM air interface as described above. As such, the OFDM transmitter 182 is configured to receive data, generate OFDM symbols from the data, and transmit the OFDM symbols on the air interface, and to define on the air interface various channels such as a PDCCH and PDSCH as discussed above. Network interface 186 may then comprise a wired and/or wireless network communication interface (such as an Ethernet interface) through which the base station may receive data over a backhaul connection that connects the base station to one or more entities of a wireless network, such as an SGW as discussed above for instance, for transmission of the data to one or more UEs served by the base station.

Controller 188, which may be integrated with OFDM transmitter 182 or one or more other components, may then control the transmission of data, including control and user data, on the downlink air interface. For example, controller 188 may allocate downlink resource blocks to UEs and generate corresponding DCI messages, and controller 46 may control transmission by OFDM transmitter 182 accordingly. Further, controller 188 may be configured to apply scheduling and assignment operations as discussed above. Thus, the controller may be configured to respond to receipt by the base station via the network interface 186 of data for transmission over the air interface to a particular UE by (i) assigning at least one of the PDSCH segments of a particular TTI for carrying the received data over the air interface to the particular UE and (ii) causing the base station to transmit via the antenna structure 184 to the UE, in the assigned PDSCH segment of the particular TTI, both the received data and an assignment to the UE of at least one PDSCH segment of a subsequent TTI for carrying additional data to the UE in the subsequent TTI.

Controller 188 could be implemented using hardware, software, and/or firmware. For example, controller 188 could include one or more processors and a non-transitory computer readable medium (e.g., volatile and/or non-volatile memory) that stores machine language instructions or other executable instructions. The instructions, when executed by the one or more processors, may cause controller 188, and thus the base station, the various base station operations described herein.

Figure 9:
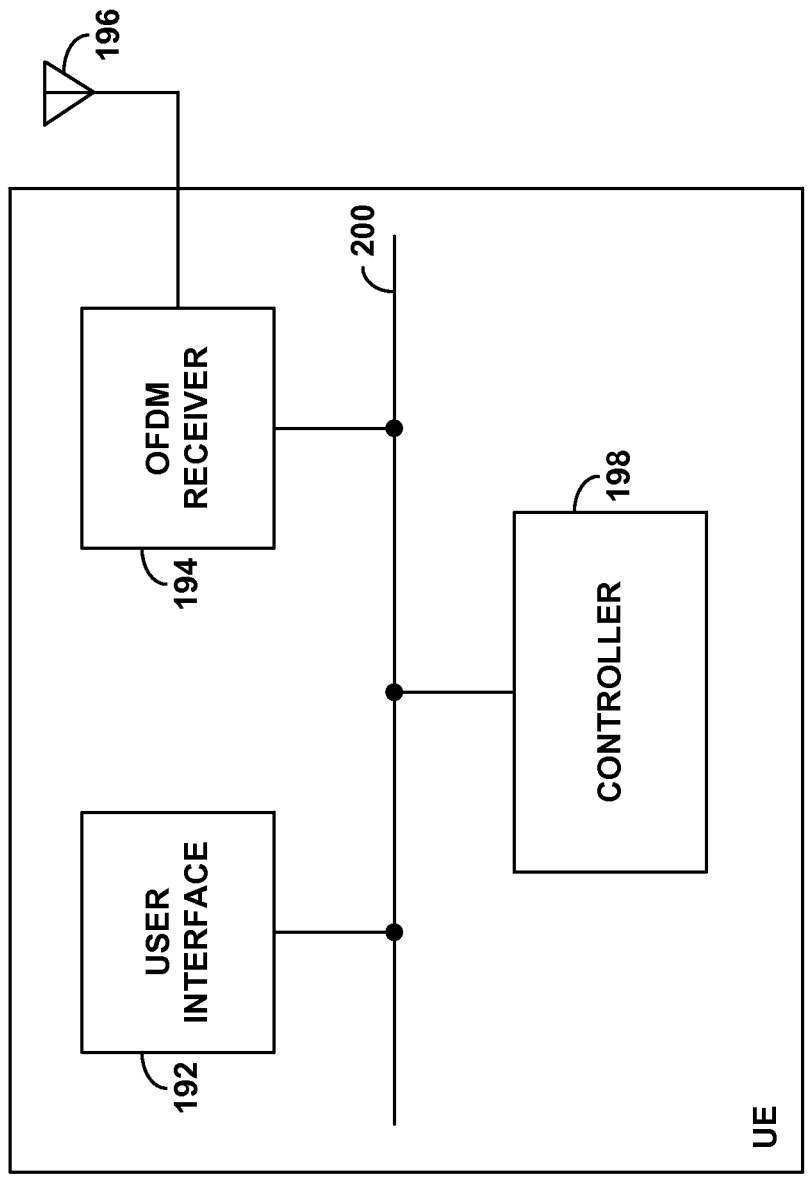
FIG. 9 is a simplified block diagram of an example UE operable in accordance with the disclosure.

Finally, FIG. 9 is a simplified block diagram of an example UE, showing some of the components of such a UE to facilitate operation in accordance with this disclosure. As shown in FIG. 9, the example UE includes a user interface 192, an OFDM receiver (transceiver) 194 and an associated antenna structure 196, and a controller 198, with various ones of these or other components being communicatively linked together by a system bus, network, or other connection mechanism 200.

User interface 192 may include input and output components to facilitate interaction with a user, if the UE is a user-operable device. OFDM receiver 194 and antenna structure 196 may then function in combination to engage in OFDM air interface communication with a cellular base station such as that described above. As such, the OFDM receiver 194 may be configured to receive OFDM communications on an air interface as described above, including for instance PDCCH communications and PDSCH communications. And controller 198, which may be integrated with OFDM receiver 194 or one or more other components, may control the processing of received communications, including control and user data, to carry out various UE operations described herein.

Exemplary embodiments have been described above. Those skilled in the art will understand, however, that changes and modifications may be made to these embodiments without departing from the true scope and spirit of the invention.

We claim:

1. In a wireless communication system in which a base station is configured to serve user equipment devices (UEs) via an air interface that spans a frequency bandwidth and that defines over time a sequence of transmission time intervals (TTIs), wherein each TTI defines a physical downlink shared channel (PDSCH) divided over the frequency bandwidth into a plurality of PDSCH segments each individually assignable on a per-UE basis to carry UE-specific data, and wherein each TTI further defines a physical downlink control channel (PDCCH), a method comprising:

receiving, by the base station, data for transmission over the air interface to a particular UE;

responsive to the receiving, assigning by the base station at least one of the PDSCH segments of a particular TTI for carrying the received data over the air interface to the particular UE, wherein assigning by the base station the PDSCH segment of the particular TTI for carrying the received data over the air interface to the particular UE comprises transmitting in the PDCCH of the particular TTI a downlink control information (DCI) message that specifies the assignment to the particular UE of the PDSCH segment of the particular TTI; and transmitting by the base station to the UE, in the assigned PDSCH segment of the particular TTI, both the received data and an assignment to the UE of at least one PDSCH segment of a subsequent TTI for carrying additional data to the UE in the subsequent TTI, wherein the method further comprises determining by the base station that there will be spare capacity in the assigned PDSCH segment of the particular TTI, and wherein transmitting in the assigned PDSCH segment of the particular TTI the assignment to the UE of the at least one PDSCH segment of the subsequent TTI is responsive to at least the determining that there will be spare capacity in the assigned PDSCH segment of the particular TTI.

2. The method of claim 1, wherein the method further comprises detecting by the eNodeB threshold PDCCH congestion, and wherein the transmitting in the assigned PDSCH segment of the particular TTI the assignment to the UE of the at least one PDSCH segment of the subsequent TTI is responsive to at least the detecting of the threshold PDCCH congestion.

3. The method of claim 2, wherein detecting threshold PDCCH congestion comprises monitoring PDCCH congestion over time and predicting that the PDCCH in the subsequent TTI will be threshold congested.

4. The method of claim 1, wherein the base station is a Long Term Evolution (LTE) eNodeB and the air interface is an LTE air interface.

5. The method of claim 4, wherein each TTI is further divided over time into a plurality of symbol time segments, wherein certain ones of the symbol time segments cooperatively define control-signaling space of the TTI, and remaining ones of the symbol time segments cooperatively define the PDSCH of the TTI, and wherein each PDSCH segment spans twelve 15 kHz sub-carriers.

6. The method of claim 1, further comprising:
including by the base station, in the assigned PDSCH segment of the particular TTI, information that enables the UE to detect presence, in the assigned PDSCH segment of the particular TTI, of the assignment to the UE of the at least one PDSCH segment of the subsequent TTI.

7. A base station configured to serve user equipment devices (UEs) via an air interface that spans a frequency bandwidth and that defines over time a sequence of transmission time intervals (TTIs), wherein each TTI defines a physical downlink shared channel (PDSCH) divided over the frequency bandwidth into a plurality of PDSCH segments each individually assignable on a per-UE basis to carry UE-specific data, and wherein each TTI further defines a physical downlink control channel (PDCCH), the base station comprising:
a backhaul interface through which the base station is configured to receive data for transmission to UEs;
an antenna structure configured to transmit on the air interface; and
a controller configured to respond to receipt by the base station via the backhaul interface of data for transmission over the air interface to a particular UE by (i) assigning at least one of the PDSCH segments of a particular TTI for carrying the received data over the air interface to the particular UE, wherein assigning the PDSCH segment of the particular TTI for carrying the received data over the air interface to the particular UE comprises causing the base station to transmit via the antenna structure to the UE, in the PDCCH of the particular TTI, a downlink control information (DCI) message that specifies the assignment to the particular UE of the PDSCH segment of the particular TTI, and (ii) causing the base station to transmit via the antenna structure to the UE, in the assigned PDSCH segment of the particular TTI, both the received data and an assignment to the UE of at least one PDSCH segment of a subsequent TTI for carrying additional data to the UE in the subsequent TTI,
wherein the controller is further configured to determine that there will be spare capacity in the assigned PDSCH segment of the particular TTI, wherein causing the base station to transmit in the assigned PDSCH segment of the particular TTI the assignment to the UE of the at least one PDSCH segment of the subsequent TTI is responsive to at least the determining by the controller that there will be spare capacity in the assigned PDSCH segment of the particular TTI.

8. The base station of claim 7, wherein the controller is further configured to detect threshold PDCCH congestion, and wherein the causing the base station to transmit in the assigned PDSCH segment of the particular TTI the assignment to the UE of the at least one PDSCH segment of the subsequent TTI is responsive to at least the detecting by the controller of the threshold PDCCH congestion.

9. The base station of claim 8, wherein detecting threshold PDCCH congestion comprises monitoring PDCCH congestion over time and predicting that the PDCCH in the subsequent TTI will be threshold congested.

10. The base station of claim 7, wherein the base station is a Long Term Evolution (LTE) eNodeB and the air interface is an LTE air interface.

11. The base station of claim 7, wherein the controller is further configured to cause the base station to include, in the assigned PDSCH segment of the particular TTI, information that enables the UE to detect presence, in the assigned PDSCH segment of the particular TTI, of the assignment to the UE of the at least one PDSCH segment of the subsequent TTI.

12. In a wireless communication system in which a user equipment device (UE) is configured to be served by a base station via an air interface that spans a frequency bandwidth and that defines over time a sequence of transmission time intervals (TTIs), wherein each TTI defines a physical downlink shared channel (PDSCH) divided over the frequency bandwidth into a plurality of PDSCH segments each individually assignable on a per-UE basis to carry UE-specific data, and wherein each TTI further defines a physical downlink control channel (PDCCH), a method comprising:
receiving by the UE in the PDCCH of a particular TTI an assignment to the UE of the PDSCH segment of the particular TTI, for carrying data destined to the UE in the particular TTI;
receiving by the UE, in the PDSCH segment assigned to the UE, both (i) the data destined to the UE and (ii) an assignment to the UE of at least one PDSCH segment of a subsequent TTI for carrying additional data to the UE in the subsequent TTI, wherein the PDSCH segment of the particular TTI includes the assignment to the UE of the PDSCH segment of the subsequent TTI in response to a determination having been made by the base station that there would be spare capacity in the PDSCH segment of the particular TTI;
passing the received data to an application layer of the UE for processing; and
responsive to the received assignment to the UE of the at least one PDSCH segment of the subsequent TTI, reading, by the UE, the additional data from the at least one PDSCH segment of the subsequent TTI.

13. The method of claim 12, further comprising:
responsive to receiving the assignment to the UE of the at least one PDSCH segment of the subsequent TTI, the UE refraining from reading the PDCCH of the subsequent TTI.

14. The method of claim 12, wherein the air interface is a Long Term Evolution (LTE) air interface.

15. The method of claim 12, further comprising:
detecting by the UE, in the assigned PDSCH segment of the particular TTI, information that indicates presence, in the assigned PDSCH segment of the particular TTI, of the assignment to the UE of the at least one PDSCH segment of the subsequent TTI; and
reading by the UE the assignment in response to detecting the information indicating presence of the assignment.

* * * * *